Oct. 8, 1935.  C. W. SINCLAIR  2,016,395
COVER PLATE FOR VEHICLE WHEELS
Filed May 9, 1932  3 Sheets-Sheet 1
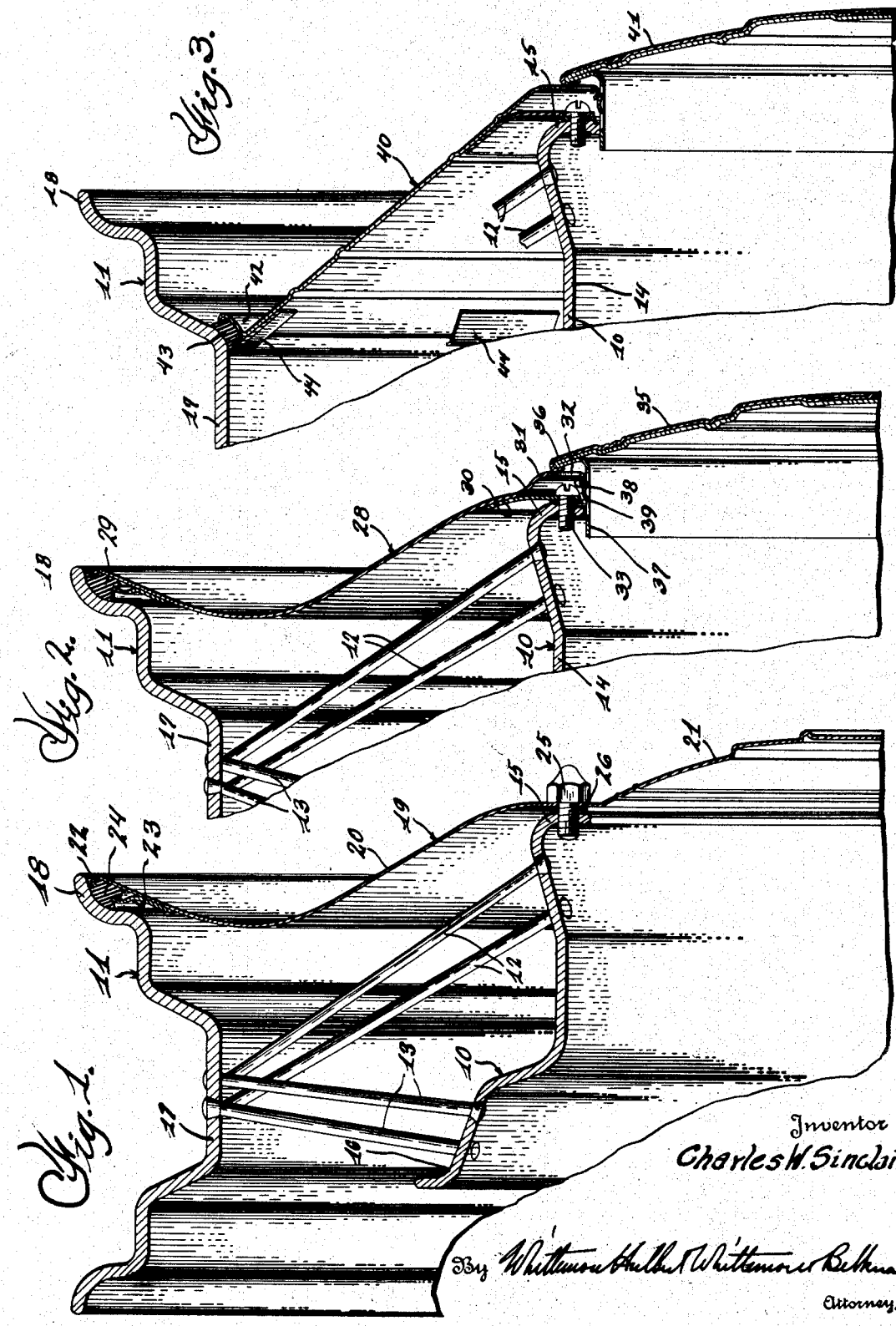
Inventor
Charles W. Sinclair Oct. 8, 1935.  C. W. SINCLAIR  2,016,395
COVER PLATE FOR VEHICLE WHEELS
Filed May 9, 1932  3 Sheets-Sheet 2
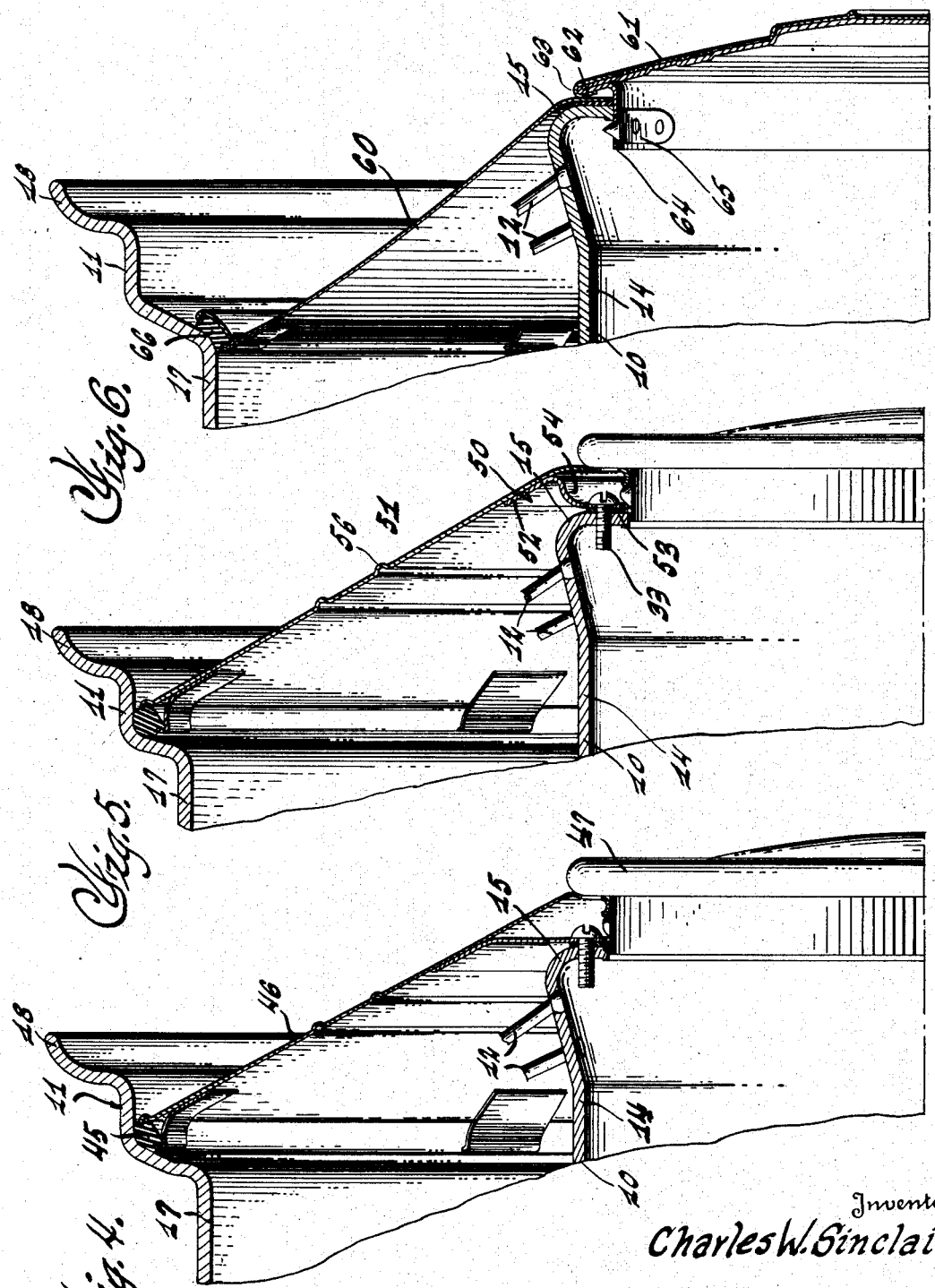
Inventor
Charles W. Sinclair
By Whittemore Hulbert Whittemore Belknap
Attorneys Oct. 8, 1935.  C. W. SINCLAIR  2,016,395
COVER PLATE FOR VEHICLE WHEELS
Filed May 9, 1932   3 Sheets-Sheet 3
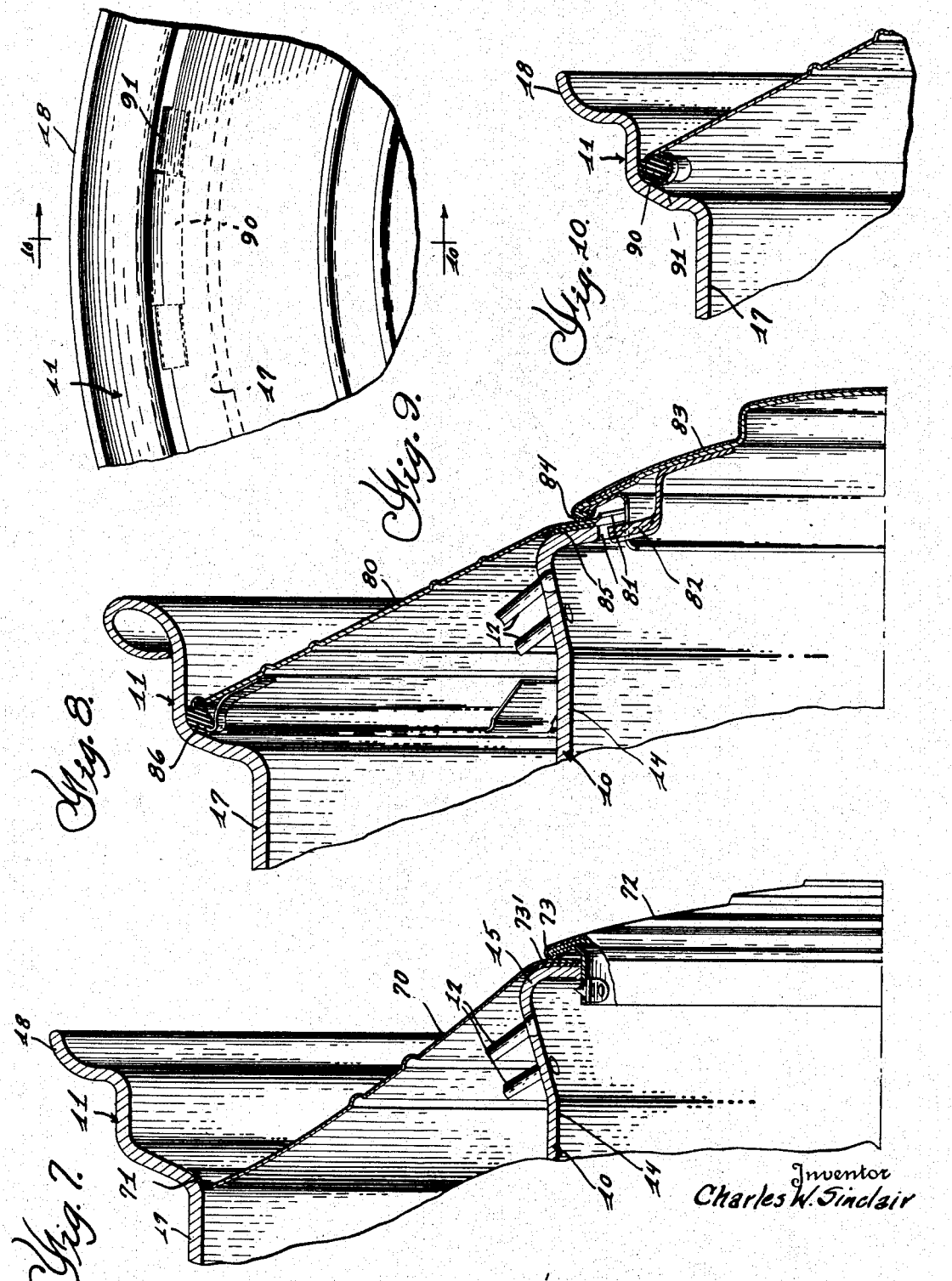
Inventor
Charles W. Sinclair
Attorneys Patented Oct. 8, 1935

2,016,395

UNITED STATES PATENT OFFICE 2,016,395

COVER PLATE FOR VEHICLE WHEELS

Charles W. Sinclair, Detroit, Mich., assignor, by mesne assignments, to The Kelsey-Hayes Wheel Company, Detroit, Mich., a corporation of Delaware Application May 9, 1932, Serial No. 610,216

9 Claims. (Cl. 301—37)

This invention relates generally to vehicle wheels and refers more particularly to cover plates for vehicle wheels.

While the desirability of providing cover plates for vehicle wheels has been recognized by the trade for some time, nevertheless, the same have not achieved general recognition due to the fact that prior devices intended for this purpose were usually impractical from a commercial standpoint. The impracticability of prior devices may be attributed to a large extent to the difficulty heretofore encountered in manufacturing the cover plates for a reasonable cost and in effectively attaching the plates to vehicle wheels so that the same not only form a rigid part of the wheels during use, but also serve to enhance the general appearance of the latter.

The present invention contemplates eliminating the foregoing difficulties by providing cover plates capable of being readily and inexpensively manufactured and by providing improved means for quickly detachably securing the cover plates to vehicle wheels under compression so as to obtain maximum rigidity.

A further advantageous feature of this invention resides in the novel means provided herein for cushioning the cover plates so as to prevent any tendency for the same to crack or buckle during use.

The foregoing as well as other objects will be made more apparent as this description proceeds, especially when considered in connection with the accompanying drawings, wherein:

Figure 1 is a fragmentary cross sectional view through a vehicle wheel illustrating one of my improved forms of cover plates in assembled relation with the wheel;

Figures 2 to 8, inclusive, are views similar to Figure 1, each showing a modified form of construction;

Figure 9 is a fragmentary side elevational view showing a still further modification of the present invention;

Figure 10 is a sectional view taken substantially on the line 10—10 of Figure 9.

Although the several cover plates and attaching means therefor forming the subject matter of this invention may be employed in association with various types of vehicle wheels, nevertheless, I have shown the same herein for the purpose of illustration as employed in connection with vehicle wire wheels having drop center rims. In the interest of simplicity, each of the illustrative embodiments of the invention are shown in assembled relation with wire wheels identical in construction having a hub shell 10 and a drop center rim 11 concentrically arranged with respect to the hub shell and connected thereto by means of the front and rear sets of spokes 12 and 13, respectively. The hub shells 10 of the vehicle wheels illustrated in the several views are preferably of conventional design in that they are provided with a barrel portion 14 terminating at the front end thereof in an inwardly extending flange 15 forming the nose of the shell and provided at the rear ends thereof with enlarged spoke attaching portions 16. The drop center rims 11 of the wheels are also shown as constructed in accordance with the usual practice in that they are formed with substantially channel-shaped base portions 17 terminating at the outer ends thereof in radially extending tire retaining flanges 18.

Referring now more in detail to the specific embodiment of the invention shown in Figure 1, it will be noted that the reference character 19 designates a cover plate for the wheel fashioned for attachment to the front side of the latter for concealing portions of the same. The cover plate 19 comprises essentially a disk 20 formed of relatively light gauge stock suitably fashioned to impart an ornamental appearance to the wheel when attached to the latter and having a central portion 21 designed to serve the purpose of the usual vehicle wheel hub cap. The peripheral portions of the disk 20 are bent rearwardly as at 22 and co-operate with suitable retainers 23 for securing a yieldable ring 24 to the inner surface of the cover plate adjacent the periphery thereof. The retainers 23 are preferably welded or otherwise suitably secured to the rear face of the disk 20 and the outer ends thereof are bent rearwardly so as to cooperate with the portions 22 in holding the resilient ring 24 in assembled relation with the cover plate. The ring 24 is preferably formed of rubber and is compressed against the front side of the rim 11 by means of suitable fastener elements 25 having head portions accessible from the front side of the wheel and having threaded shank portions extending through suitable openings formed in the cover plate and threadedly engaging the hub shell nose 15. In order to eliminate squeaks or other objectionable noises in the wheel, suitable rubber or other non-metallic washers 26 are interposed between the cover plate and adjacent portions of the hub shell nose 15.

While it will be apparent from the following description that the peripheral portions of the cover plate may be fashioned to engage different portions of the front side of the vehicle rim members, nevertheless, in the embodiment of the invention illustrated in Figure 1, the resilient ring 24 on the cover plate 19 is shown as engaging the front tire retaining flange 18 adjacent the periphery of the latter. By reason of the above construction, the cover plate not only serves to conceal the hub shell and spokes of the wheel, but also functions to substantially conceal the drop center rim. Moreover, in view of the fact that the cover plate 19 also forms the usual hub cap for the hub shell of the wheel, it will be apparent that the same renders it possible to eliminate separate hub cap constructions, and, as a consequence, materially reduces the cost of manufacture.

In the construction illustrated in Figure 2, the cover plate 28 does not form the hub cap for the vehicle wheel as in the first described form of the invention, and, furthermore, is secured to the front side of the wheel in a different manner. In detail, the cover plate 28 is provided with a central opening therethrough in alignment with the opening in the hub shell nose and a resilient ring 29 is secured to the peripheral portions of the cover plate in the same manner as the ring 24 is secured to the cover plate 19. The resilient ring 29 is secured under compression to the front side of the tire retaining flange 18 adjacent the periphery of the latter by means of a mounting ring 30 welded or otherwise suitably secured to the rear side of the cover plate and having the inner portions thereof positioned adjacent the front side of the hub shell nose 15. The inner portions of the cover plate adjacent the ring 30 are flared outwardly as at 31 and are apertured as at 32 for receiving the fastener elements 33. The fastener elements 33 are preferably in the form of screws having head portions located within the space between the mounting ring and adjacent portions of the cover plate and having shank portions threadedly engaging the hub shell nose.

In the construction shown in Figure 2, the hub cap 35 for the wheel cooperates with the cover plate to enhance the general appearance of the wheel. As shown, the hub cap is provided with a peripheral portion 36 fashioned to conceal the openings 32 through the cover plate 28 when the same is in assembled relation with the wheel and having a reduced annular pilot 37 of sufficient diameter to project through the aligned openings in the hub shell nose and cover plate. In this connection, it is to be noted that the cover plate in the present instance functions to detachably secure the hub cap in assembled relation with the wheel and for accomplishing this result, the inner edges of the cover plate are bent as at 38 to provide shoulders fashioned to have a snap engagement with the resilient fingers 39 struck out from the annular pilot 37. Thus, from the foregoing, it will be observed that the hub cap 35 has a snap engagement with the inner edge of the cover plate, and, furthermore, cooperates with the latter to conceal the means for attaching the cover plate to the vehicle wheel. It will further be observed that with the foregoing construction, the cover plate may be removed if desired and a hub cap mounted within the wheel to provide the usual type of construction.

The modification illustrated in Figure 3 differs from either of the foregoing constructions in the particular shape of the cover plate and in the point of engagement of the periphery of the plate with the drop center rim. As will be observed from Figure 3, the manner in which the cover plate is secured to the hub shell and the manner in which the same cooperates with the hub cap 41 to conceal the fastening means is the same as previously described in connection with the embodiment of the invention shown in Figure 2. In the present instance, however, the peripheral portions of the cover plate 40 are bent outwardly at substantially right angles to the major portion of the cover plate to provide an annular flange 42 forming a seat for the resilient ring 43. The free edge of the flange 42 is curved upwardly and cooperates with suitable retainers 44 in the same manner as previously described to secure the resilient ring 43 to the cover plate. The foregoing construction is such as to provide for engaging the resilient ring 43 with the drop center rim at the juncture of the leg portions of the channel of the rim with the base portions thereof and thereby permits the use of a plate having an abrupt conical shape. Moreover, the above arrangement permits passing the valve stem for the pneumatic tire through the front side of the rim well beyond the cover plate.

In the event it is desired to expose the front tire retaining flange on the rim, the construction illustrated in Figure 4 may be resorted to wherein the resilient ring 45 at the periphery of the cover plate 46 engages the front side of the drop center rim at the juncture of the tire retaining flanges 18 and the legs of the channel-shaped base of the rim. The inner edge portions of the cover plate are positioned in advance of the hub shell nose so as to impart the desired conical effect to the wheel and are fashioned for snap engagement with the hub cap 47. The manner in which the aforesaid inner portions of the cover plate 46 are detachably secured to the hub shell and the construction thereof which permits the same to secure the hub cap in place is substantially the same as set forth in connection with the embodiment of the invention described in connection with Figure 2.

The construction illustrated in Figure 5 differs from the embodiment of the invention shown in Figure 4 in the specific construction of the mounting ring 50. As shown in Figure 5, the mounting ring 50, in addition to serving as attaching means for the cover plate 51, also functions to reinforce the central portions of the latter. In detail, the peripheral portions 52 of the mounting ring 50 embrace the inner surface of the cover plate, while the inner portions 53 thereof are spaced axially inwardly from the adjacent portion of the cover plate and are connected to the peripheral portions aforesaid of the latter by means of a substantially axially extending annular portion 54. The radial portions 53 of the mounting ring 50 may be secured to the hub shell nose in the same manner as the ring 30, in the embodiment of the invention illustrated in Figure 2 is secured to the shell, and the axially extending annular portions 54 of the ring 50 cooperate with the portions 53 to reinforce the central portions of the cover plate from the shell. Additional reinforcing of the cover plate may be secured if desired by pressing portions of the same outwardly as indicated in Figure 5 to form ribs 56.

The modification illustrated in Figure 6 differs from the embodiments of the invention previously described in the particular manner in which the inner edge portions of the cover plate are secured to the nose of the hub shell. The cover plate illustrated in Figure 6 is designated by the reference character 60 and is secured to the wheel under compression by means of the hub cap 61 for the shell. In detail, a resilient ring 62 formed of rubber or other suitable material is interposed between the front side of the nose of the shell and the adjacent side of the inner edge portions of the cover plate and is secured under compression against the hub shell nose by clamping the peripheral portions 63 of the hub cap to the front side of the cover plate. The hub cap 61 is preferably of the snap-on type having a pilot 64 provided with spring clips 65 fashioned to snap into engagement with the hub shell nose and to maintain the peripheral portions 63 of the cap in engagement with the cover plate under tension during use. The periphery of the cover plate 60 is provided with a resilient ring 66 fashioned for engagement with the front side of the tire carrying rim in the same manner as pointed out in connection with several of the previously described embodiments of the invention. The foregoing construction renders it possible to provide a simple, inexpensive cover plate construction capable of being readily assembled with and removed from the vehicle wheel.

Figure 7 of the drawings also features an extremely simple and inexpensive cover plate 70 distinguished from the foregoing construction in that the usual resilient ring at the periphery of the aforesaid cover plates is omitted and a resilient flange 71 substituted therefor. In detail, the periphery of the cover plate 70 is bent laterally outwardly to provide an annular flange 71 having a cross sectional contour determined in accordance with the portion of the front side of the tire carrying rim with which the same is adapted to engage. In the present instance, the resilient flange 71 engages the front side of the tire carrying rim at the juncture between the base of the channel and the front leg portion of the latter as clearly shown in Figure 7. The central portion of the cover plate 70 is apertured in alignment with the aperture in the hub shell nose for receiving a hub cap 72 and the inner edge portions of the cover plate are clamped to the front side of the hub shell nose by means of the peripheral portions 73 of the cap. If desired, a suitable non-metallic ring 73' may also be interposed between the hub shell nose and adjacent portions of the cover plate for insulating the same from metallic contact with each other. The hub cap 72 may be of the snap-on type and is provided with an annular pilot 73 having spring fingers 74, similar in construction to the fingers 65 set forth in the preceding embodiment of the invention, for yieldably urging the peripheral portions 73 of the hub cap into engagement with the cover plate 70. While the rubber ring featured in the foregoing modifications of the invention is omitted in the present instance, nevertheless, it is to be noted that the flange 71 is resilient and the construction is such as to provide for securing the cover plate between the shell and rim under compression.

In Figure 8 of the drawings, I have illustrated a cover plate 80 fashioned for application to a vehicle wheel wherein the hub cap is adapted to be assembled with the shell by a rotative movement thereof relative to the shell. As shown in Figure 8, the central portion of the cover plate 80 is provided with an opening therethrough in alignment with the opening in the hub shell nose, and the inner edge portions of both the hub shell nose and cover plate are formed with aligned slots 81 therethrough for receiving suitable cam portions 82 fixed to and extending rearwardly from the hub cap 83. The cam portions 82 are arcuate in cross section and function upon rotation of the cap 83 relative to the hub shell nose to cam the peripheral portions 84 of the cap into engagement with the front side of the cover plate for clamping the latter to the hub shell nose. If desired, an annular non-metallic washer 85 may be interposed between the hub shell nose and adjacent portions of the cover plate so as to eliminate any tendency for squeaks to develop in this portion of the wheel during use. The periphery of the cover plate 80 is provided with a rubber ring 86 for engaging the front side of the rim member in the same manner as brought out in any of the foregoing embodiments of the invention illustrating rubber ring members.

The modification of the invention illustrated in Figures 9 and 10 differs essentially from the foregoing embodiments of the invention in the manner in which the peripheral portions of the cover plate are secured to the front side of the tire carrying rim member. As shown in Figures 9 and 10, the compression seal between the periphery of the cover and adjacent surface of the rim member in the present instance is accomplished by a plurality of resilient inserts 90 equally spaced around the periphery of the cover plate. In detail, the periphery of the cover plate is provided with circumferentially spaced flanges 91 adapted to be clinched over the end portions of the resilient inserts 90 for retaining the latter in place. As shown particularly in Figure 9, when the flanges 91 are clinched over the end portions of the inserts, the latter portions are compressed relative to the central portion thereof. Compressing the end portions of the resilient inserts obviously serves to extrude the central portion thereof beyond the said end portions and thereby provides for engaging the central portion with the front side of the tire carrying rim member in the manner illustrated in Figure 9.

From the foregoing, it will be observed that while each of the embodiments of the invention differ structurally from each other, nevertheless, all of the various modifications are extremely simple in construction and are capable of being inexpensively manufactured. It will also be observed that the fastening means provided for attaching the various cover plates hereinbefore described to the vehicle wheels is relatively simple and readily accessible so as to provide for expediently assembling the cover plates with and removing the same from the vehicle wheels. It will further be apparent that in each embodiment of the invention, the cover plates are secured under compression between the hub shell and rim so as to provide for obtaining maximum rigidity. In addition to the foregoing, it is to be noted that each of the cover plates illustrated herein are secured in place in such a manner that there will be no tendency for the same to buckle or crack during use.

While several embodiments of the invention have been shown and described herein somewhat in detail, it is to be understood that no attempt has been made to illustrate all of the modifications of the invention, and, accordingly, reservation is made to make such changes as may come within the purview of the accompanying claims.

What I claim as my invention is:

1. A vehicle wheel having in combination, a rim member, a hub member concentrically arranged with respect to the rim member and connected thereto, a centrally apertured cover plate having the peripheral portion thereof engaging the front side of the rim member and having the portion adjacent the aperture therethrough spaced in advance of the forward end of the hub, attaching means fixed to the rear side of the cover plate including an element having a portion positioned adjacent the front side of the hub member and having a plurality of openings through the latter portion arranged in alignment with openings through the cover plate, and fastening means insertable through the openings in the cover plate and engageable with the element and hub member for clamping the former to the latter.

2. A vehicle wheel having in combination, a rim member, a hub member concentrically arranged with respect to the rim member and connected thereto, a centrally apertured cover plate having the peripheral portion thereof engaging the front side of the rim member and having the portion adjacent the aperture therethrough spaced in advance of the forward end of the hub, attaching means fixed to the rear side of the cover plate including an element having a portion positioned adjacent the front side of the hub member and having a plurality of openings through the latter portion arranged in alignment with openings through the cover plate, fastening means insertable through the openings in the cover plate and engageable with the element and hub member for clamping the former to the latter, and a closure for the central opening through the cover plate having portions overlapping the openings aforesaid through the cover plate at the front side of the latter for concealing these openings and the fastening means for the cover plate.

3. A vehicle wheel having in combination, a rim member, a hub shell connected to the rim member and having an inwardly extending flange at the front end thereof, a cover plate for the wheel concealing the connection between the rim member and hub shell and having an opening therethrough at the center thereof, means for attaching the cover plate to the wheel with the peripheral portion of the latter engaging the rim member and with the opening therethrough opposite the front end of the shell, said means including an attaching element carried by the cover plate in rear of the portion of the latter surrounding the opening therethrough and having flexible portions engaging the front side of the flange aforesaid on the hub shell, and means insertable through an opening in a portion of the cover plate in advance of said element for detachably clamping the latter to the hub shell.

4. A vehicle wheel having in combination, a rim member, a hub shell concentrically arranged with respect to the rim member and having an inwardly extending flange at the front end thereof, a centrally apertured cover plate having the peripheral portion thereof engaging the front side of the rim member and having the portion surrounding the opening therethrough spaced in advance of the flange aforesaid on the hub shell, a closure for the opening through the cover plate having a snap engagement with the edges of the opening, and means concealed by the cover plate and closure for detachably securing said plate to the inwardly extending flange on the hub shell.

5. A cover plate for vehicle wheels having a hub member provided with an inwardly extending flange at the front end thereof, comprising a central portion having an opening therethrough adapted to register with the hub member, an element carried by the cover plate and spaced axially rearwardly from the marginal portion of the central opening through the cover plate for engagement with the inwardly extending flange at the front end of the hub, said element having an opening therethrough registering with an opening in said flange for receiving a fastener element and the marginal portion of the cover plate in advance of said element having an opening therethrough of sufficient dimension to provide for the insertion of the fastener element therethrough.

6. A cover for vehicle wheels having a rim member and a hub member, comprising a peripheral portion positioned opposite the rim member and a central portion positioned opposite the hub member, an element carried by the cover plate at the rear side thereof and having a portion spaced axially rearwardly from a portion of the cover plate opposite the hub member, said element having an opening therethrough for receiving a fastener element and the cover plate having an opening therethrough in alignment with the opening in the element to provide for inserting the fastener into the latter opening from the front side of the cover plate.

7. A vehicle wheel having in combination, a hub member, a cover plate for the wheel having an opening through the central portion thereof and having the portion adjacent the opening spaced in advance of the forward end of the hub, attaching means fixed to the rear side of the cover plate including an element having a portion positioned adjacent the front side of the hub member and having a plurality of openings through the latter portion arranged in alignment with openings through the cover plate, fastening means insertable through the openings in the cover plate and engageable with the element and hub member for clamping the former to the latter and a closure for the opening through the cover plate having a portion fashioned to snap into engagement with the inner edge of the opening through the cover plate and having another portion overlapping the openings aforesaid through the cover plate at the front side of the latter for concealing said openings and the fastening means for securing the cover plate to the hub member.

8. In a vehicle wheel having a hub member, a cover plate for the front side of the wheel having a centrally disposed opening therethrough and having axially spaced radially extending portions surrounding the opening, fastener elements extending through openings in the rear radially extending portion and engageable with the hub member to secure the cover plate in assembled relation with the wheel, the front radially extending portion of the cover plate having openings therethrough aligned with the openings in the rear portion aforesaid and being of sufficient diameter to permit the passage of the fastener elements therethrough, and a removable closure for the central opening through the cover plate having a peripheral portion engaging the front portion of the cover plate radially outwardly beyond the openings therethrough to conceal both the openings and the fastener elements.

9. In a vehicle wheel having a hub member, a cover plate for the front side of the wheel having a centrally disposed opening therethrough and having axially spaced substantially radially extending portions surrounding the opening, fastener elements extending through openings in the rear radial portion and engaging the hub member to clamp the cover plate thereto, the front radial portion having openings therethrough in alignment with the openings in the rear portion of sufficient size to permit the passage of the fastener elements therethrough, and a removable closure for the central opening in the cover plate having a portion fashioned to snap into engagement with the edge of one of the portions aforesaid on the cover plate and having a radially extending portion engaging the front portion of the cover plate beyond the openings therethrough to conceal the latter as well as the fastener elements.

CHARLES W. SINCLAIR.